(12) United States Patent
Takeuchi et al.

(10) Patent No.: US 10,554,081 B2
(45) Date of Patent: Feb. 4, 2020

(54) SYNCHRONOUS RELUCTANCE ROTARY ELECTRIC MACHINE

(71) Applicants: Toshiba Industrial Products and Systems Corporation, Kawasaki-shi (JP); Toshiba Infrastructure Systems & Solutions Corporation, Kawasaki-shi (JP)

(72) Inventors: Katsutoku Takeuchi, Kokubunji (JP); Makoto Matsushita, Fuchu (JP); Toshio Hasebe, Hachioji (JP); Masaaki Matsumoto, Mie (JP)

(73) Assignees: Toshiba Industrial Products and Systems Corporation, Kawasaki-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/387,583

(22) Filed: Apr. 18, 2019

(65) Prior Publication Data

US 2019/0245394 A1    Aug. 8, 2019

Related U.S. Application Data

(63) Continuation of application No. PCT/JP2017/038031, filed on Oct. 20, 2017.

(30) Foreign Application Priority Data

Nov. 11, 2016    (JP) ................................ 2016-220518

(51) Int. Cl.
*H02K 1/06* (2006.01)
*H02K 1/24* (2006.01)
(Continued)

(52) U.S. Cl.
CPC ............. *H02K 1/246* (2013.01); *F04D 13/06* (2013.01); *F04D 29/007* (2013.01); *H02K 19/103* (2013.01); *H02K 2213/03* (2013.01)

(58) Field of Classification Search
CPC ... H02K 1/246; H02K 19/103; H02K 2213/03
See application file for complete search history.

(56) References Cited

U.S. PATENT DOCUMENTS 9,800,103 B2 *  10/2017  Buttner ................. H02K 15/02
2005/0140236 A1  6/2005  Jeong et al.
(Continued)

FOREIGN PATENT DOCUMENTS

JP     11-262205      9/1999
JP     2005-198487    7/2005
(Continued)

OTHER PUBLICATIONS

International Search Report dated Jan. 16, 2018 in PCT/JP2017/038031, filed on Oct. 20, 2017 (with English Translation).

*Primary Examiner* — Hanh N Nguyen
(74) *Attorney, Agent, or Firm* — Oblon, McClelland, Maier & Neustadt, L.L.P.

(57) ABSTRACT

A synchronous reluctance rotary electric machine of an embodiment includes a shaft and a rotor core. The shaft rotates around a rotation axis. The rotor core is fixed to the shaft, includes four layers of hollow parts having a convex shape toward a radially inner side formed for each pole in cross section, and includes bridges between the respective hollow parts and an outer circumferential surface thereof. Then, in each pole, when a center in a circumferential direction is a pole center, both ends in the circumferential direction are pole ends, and the plurality of bridges are a first layer bridge, a second layer bridge, a third layer bridge, and a fourth layer bridge in order from the pole center toward each of the pole ends, a circumferential width between the (Continued)

second layer bridge and the third layer bridge is set to be greater than a circumferential width between the first layer bridge and the second layer bridge and a circumferential width between the third layer bridge and the fourth layer bridge.

4 Claims, 5 Drawing Sheets

(51) Int. Cl.
    *H02K 19/10*     (2006.01)
    *F04D 29/00*     (2006.01)
    *F04D 13/06*     (2006.01)

(56) References Cited

U.S. PATENT DOCUMENTS

| | | | |
|---|---|---|---|
| 2009/0224624 A1 | 9/2009 | Kumar et al. | |
| 2012/0139464 A1* | 6/2012 | Filipeti | H02K 1/246 318/400.34 |
| 2013/0119819 A1* | 5/2013 | Lendenmann | H02K 1/246 310/216.107 |
| 2015/0115758 A1 | 4/2015 | Koka et al. | |
| 2015/0280498 A1* | 10/2015 | Kolehmainen | H02K 1/246 310/216.107 |

FOREIGN PATENT DOCUMENTS

| | | |
|---|---|---|
| JP | 2013-225997 | 10/2013 |
| JP | 2014-193076 | 10/2014 |
| JP | 5866074 | 2/2016 |

* cited by examiner

SYNCHRONOUS RELUCTANCE ROTARY ELECTRIC MACHINE

CROSS-REFERENCE TO RELATED APPLICATIONS

This application is a continuation of International Application No. PCT/JP2017/038031, filed Oct. 20, 2017, which is based upon and claims the benefit of priority from Japanese Patent Application No. 2016-220518, filed on Nov. 11, 2016; the entire contents of which are incorporated herein by reference.

FIELD

Embodiments described herein relate generally to a synchronous reluctance rotary electric machine.

BACKGROUND

A synchronous reluctance type rotary electric machine includes a rotor and a stator. The rotor includes a shaft rotatably supported and extending in an axial direction with a rotation axis as a center, and a rotor core externally fitted and fixed to the shaft. The stator is disposed to be spaced apart from the rotor core around an outer circumference of the rotor core. The stator includes a stator core having a plurality of teeth disposed at intervals in a circumferential direction and includes multipole multiphase armature windings respectively wound around the plurality of teeth.

A plurality of hollow parts are formed to be aligned in a radial direction for each pole in the rotor core. Each of the hollow parts is formed to be curved toward the radially inner side such that a pole center thereof is positioned furthest inward in the radial direction to follow a flow of magnetic flux formed when the armature windings are energized in many cases.

When the hollow parts are formed in this manner, a direction in which magnetic flux easily flows and a direction in which magnetic flux does not readily flow are formed in the rotor core. With such a configuration, the synchronous reluctance type rotary electric machine rotates the shaft using a reluctance torque generated by the hollow parts.

Incidentally, slots formed between the teeth of the stator core are portions in which magnetic flux does not readily flow. Therefore, a magnetic flux density changes rapidly between the teeth and the slots (hereinafter, this rapid change in the magnetic flux density is referred to as magnetic irregularities of the stator). On the other hand, the rotor core also has a plurality of portions in which the magnetic flux density changes rapidly due to the hollow parts formed to generate a reluctance torque (hereinafter, this rapid change in the magnetic flux density is referred to as magnetic irregularities of the rotor). Thus, torque ripple is generated by an interaction between the magnetic irregularities of the stator and the magnetic irregularities of the rotor. Also, there is a likelihood that the torque ripple increases when the magnetic irregularities of the stator core and the magnetic irregularities of the rotor core resonate.

DETAILED DESCRIPTION

A synchronous reluctance rotary electric machine of an embodiment includes a shaft and a rotor core. The shaft rotates around a rotation axis. The rotor core is fixed to the shaft, includes four layers of hollow parts having a convex shape toward a radially inner side formed for each pole in cross section, and includes bridges between the respective hollow parts and an outer circumferential surface thereof. Thus, in each pole, when a center in a circumferential direction is a pole center, both ends in the circumferential direction are pole ends, and the plurality of bridges are a first layer bridge, a second layer bridge, a third layer bridge, and a fourth layer bridge in order from the pole center toward each of the pole ends, a circumferential width between the second layer bridge and the third layer bridge is set to be greater than a circumferential width between the first layer bridge and the second layer bridge and a circumferential width between the third layer bridge and the fourth layer bridge.

Hereinafter, a synchronous reluctance rotary electric machine of an embodiment will be described with reference to the drawings.

Figure 1:
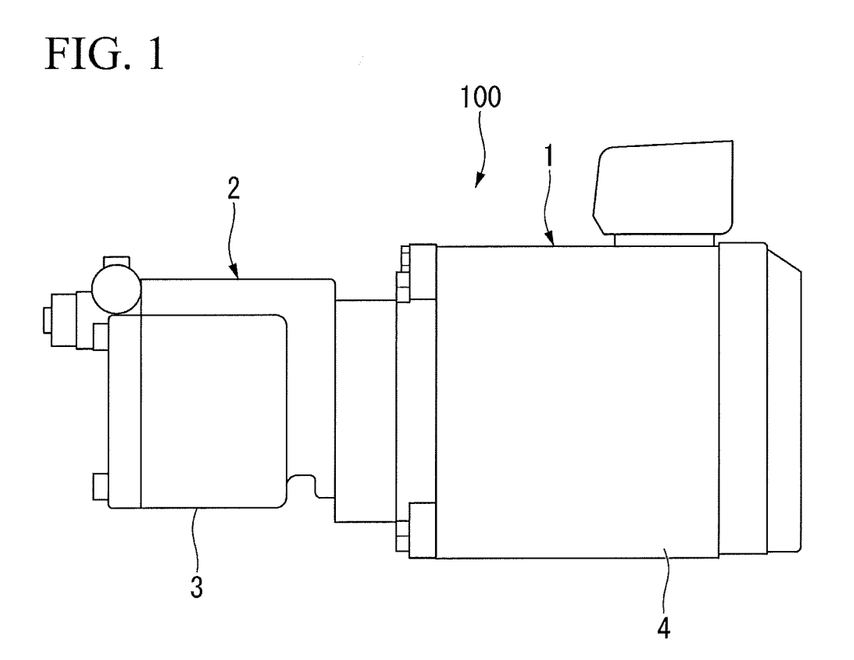
FIG. 1 is a schematic configuration view showing a hydraulic pump of an embodiment.

FIG. 1 is a schematic configuration view of a hydraulic pump 100 in which a synchronous reluctance rotary electric machine (hereinafter simply referred to as a rotary electric machine) 1 is incorporated.

As shown in FIG. 1, the hydraulic pump 100 is constituted by a pump unit 2 and the rotary electric machine 1 which drives the pump unit 2. In the pump unit 2, a pump main body (not shown) is housed in a pump casing 3 having a waterproof characteristic. A driving force of the rotary electric machine 1 is transmitted to the pump main body. When the pump main body is driven, a liquid is suctioned into or discharged from the pump casing 3.

On the other hand, the rotary electric machine 1 is constituted by a motor casing 4, and a stator 6 and a rotor 7 to be described below housed in the motor casing 4. The motor casing 4 and the pump casing 3 are connected to each other using, for example, bolts or the like so that a waterproof characteristic can be secured. A power feeding box 5 for supplying a current to the stator 6 is provided in the motor casing 4.

Figure 2:
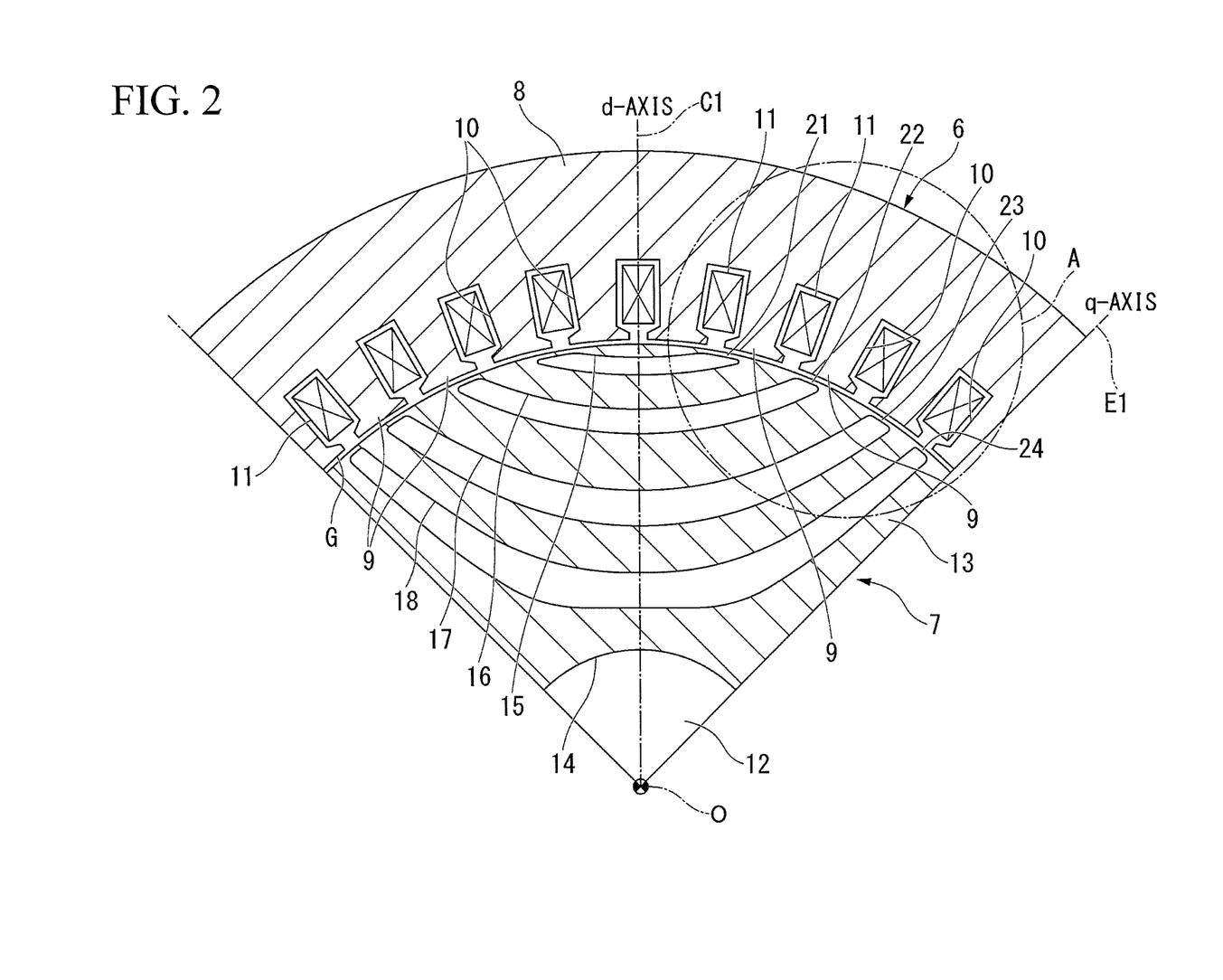
FIG. 2 is a cross-sectional view perpendicular to a rotating shaft showing a configuration of a portion of a rotary electric machine of the embodiment.

FIG. 2 is a cross-sectional view perpendicular to a rotating shaft 12 showing a configuration of a portion of the rotary electric machine 1. Further, in FIG. 2, a quarter sector of the rotary electric machine 1, that is, only a quarter-circumference circumferential angular region is shown.

As shown in FIG. 2, the rotary electric machine 1 includes the substantially cylindrical stator 6, and the rotor 7 provided on a radially inner side of the stator 6 and provided to be rotatable with respect to the stator 6. Further, the stator 6 and the rotor 7 are disposed in a state in which central axes thereof are positioned on a common axis. Hereinafter, the common axis will be referred to as a central axis (rotation axis) O, a direction perpendicular to the central axis will be referred to as a radial direction, and a direction of revolving around the central axis O will be referred to as a circumferential direction.

The stator 6 includes a substantially cylindrical stator core 8. The stator core 8 can be formed by laminating a plurality of electromagnetic steel sheets or by compression-molding a soft magnetic powder. On an inner circumferential surface of the stator core 8, a plurality of teeth 9 protruding toward the central axis O and disposed at regular intervals in the circumferential direction are integrally molded. For example, in the present embodiment, the number of teeth 9 is set to "36."

The teeth 9 are formed to have a substantially T-shaped cross section along the radial direction. A plurality of slots 10 and the plurality of teeth 9 are formed at regular intervals in the circumferential direction so that one slot 10 is disposed between adjacent teeth 9. The number of slots 10 is also the same as the number of teeth 9. That is, for example, in the present embodiment, the number of slots 10 is set to "36."

Through these slots 10, armature windings 11 are wound around each of the teeth 9. The armature windings 11 are wound around each of the teeth 9 on an insulator or an insulating film.

The rotor 7 includes the rotating shaft 12 extending along the central axis O and a substantially columnar rotor core 13 externally fitted and fixed to the rotating shaft 12.

The rotor core 13 can be formed by laminating a plurality of electromagnetic steel sheets or by compression-molding a soft magnetic powder. An outer diameter of the rotor core 13 is set such that a predetermined air gap G is formed between each of the teeth 9 and the rotor core 13 facing each other in the radial direction.

Also, a through hole 14 penetrating along the central axis O is formed at a radial center of the rotor core 13. The rotating shaft 12 is press-fitted or the like to the through hole 14, and thereby the rotating shaft 12 and the rotor core 13 rotate integrally.

Further, four layers of hollow parts (flux barriers) 15, 16, 17, and 18 (a first hollow part 15, a second hollow part 16, a third hollow part 17, and a fourth hollow part 18) are formed to be aligned in the radial direction in each of the quarter-circumference circumferential angular regions of the rotor core 13. That is, the first hollow part 15 is formed on an outermost side in the radial direction (a position farthest from the rotating shaft 12), and the second hollow part 16, the third hollow part 17, and the fourth hollow part 18 are formed to be aligned in this order from the first hollow part 15 toward the radially inner side. Thus, the fourth hollow part 18 is disposed on an innermost side in the radial direction (a position closest to the rotating shaft 12).

Also, each of the hollow parts 15 to 18 is formed to follow a flow of magnetic flux formed when the armature windings 11 are energized. That is, each of the hollow parts 15 to 18 is formed to be curved so that a center thereof in the circumferential direction is positioned furthest inward in the radial direction (to have a convex shape toward a radially inner side). Thereby, a direction in which the magnetic flux easily flows and a direction in which the magnetic flux does not readily flow are formed in the rotor core 13.

Here, in the present embodiment, a direction in which the magnetic flux easily flows is referred to as a q-axis. Also, a direction in the radial direction that is electrically and magnetically perpendicular to the q-axis is referred to as a d-axis. That is, each of the hollow parts 15 to 18 forms a multilayer structure in the radial direction along the d-axis.

More specifically, regarding a q-axis direction in the rotor core 13, a direction in which a flow of the magnetic flux is not interrupted by each of the hollow parts 15 to 18 is referred to as the q-axis. That is, a positive magnetic potential (for example, an N pole of a magnet being brought close thereto) is given to an arbitrary circumferential angular position on an outer circumferential surface 13a of the rotor core 13. Also, a negative magnetic potential (for example, an S pole of a magnet being brought close thereto) is given to another arbitrary circumferential angular position shifted by one pole (mechanical angle of 90 degrees in the present embodiment) with respect to the positive magnetic potential. Then, when positions of such positive magnetic potential and negative magnetic potential are shifted in the circumferential direction, a direction from the central axis O toward an arbitrary position when a majority of the magnetic flux flows is defined as the q-axis. Thus, the longitudinal direction of each of the hollow parts 15 to 18 is the q-axis.

On the other hand, a direction in which a flow of the magnetic flux is interrupted by each of the hollow parts 15 to 18, that is, a direction magnetically perpendicular to the q-axis is referred to as the d-axis. In the present embodiment, a direction parallel to a direction in which two rotor core portions, separated into a region close to the central axis O and a region which is distant from the central axis O by each of the hollow parts 15 to 18, face each other is the d-axis. Also, when the hollow parts 15 to 18 are formed in multiple layers (four layers in the present embodiment), a direction in which the layers overlap is the d-axis. In the present embodiment, the d-axis is not limited to being electrically and magnetically perpendicular to the q-axis and may intersect the q-axis with a certain degree of angular width (for example, mechanical angle of about 10 degrees) from the perpendicular angle.

As described above, the rotor core 13 is configured to have four poles, and four layers of the hollow parts 15, 16, 17, and 18 are formed for each pole (a quarter-circumference circumferential angular region of the rotor core 13). Thus, one pole is a region between the q-axes.

In the following description, the d-axis will be referred to as a pole center C1, and the q-axis (both ends in the circumferential direction of the quarter-circumference circumferential angular region) will be referred to as a pole end E1 in some cases. That is, each of the hollow parts 15 to 18 is formed to be curved toward the radially inner side so that the pole center C1 thereon is positioned furthest inward in the radial direction.

Also, each of the hollow parts 15 to 18 is formed to be curved so that both ends thereof in the longitudinal direction are positioned in the vicinity of the outer circumferential surface 13a of the rotor core 13 when viewed from the central axis O direction. Then, each of the hollow parts 15 to 18 is formed to follow the q-axis as a position thereon becomes closer to the both ends in the longitudinal direction and to be perpendicular to the d-axis as a position thereon becomes closer to a center in the longitudinal direction. Further, each of the hollow parts 15 to 18 is formed to have a larger opening area in order from the first hollow part 15.

Figure 3:
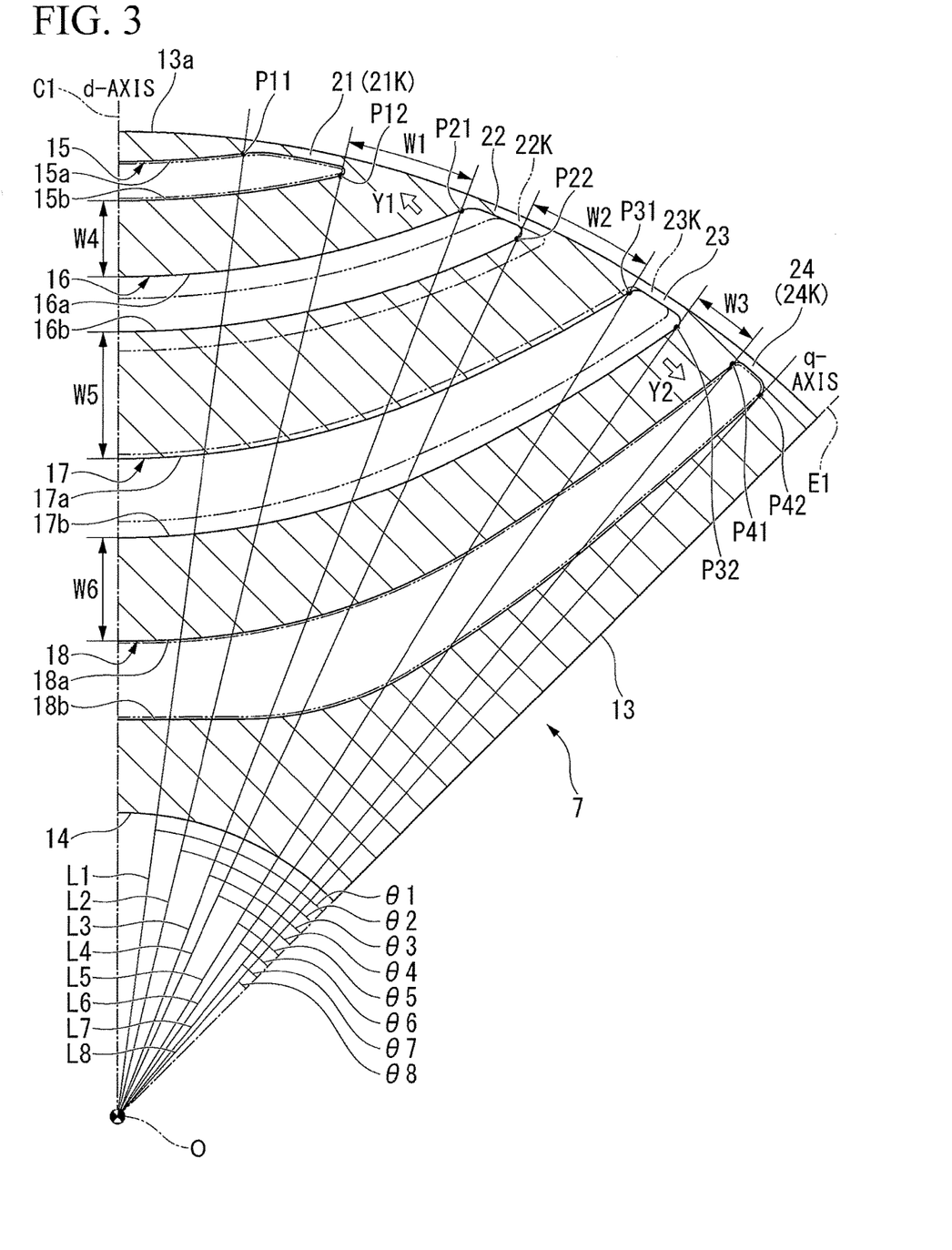
FIG. 3 is an enlarged view of a portion A of FIG. 2.

FIG. 3 is an enlarged view of a portion A of FIG. 2.

As shown in FIG. 3, bridges 21, 22, 23, and 24 (first bridge 21, second bridge 22, third bridge 23, and fourth bridge 24) are respectively formed between both ends in the circumferential direction of the hollow parts 15 to 18 and the outer circumferential surface 13a of the rotor core 13. Specifically, the bridges 21 to 24 are those formed on a side of the outer circumferential portion of the rotor core 13 at each of the hollow parts 15 to 18 in a range in which thicknesses thereof rapidly change. Further, the thickness refers to a thickness in a normal direction of the outer circumferential surface 13a of the rotor core 13.

Further, the bridges 21 to 24 will be described in detail below.

In describing the bridges 21 to 24 in detail, first, shapes of both ends in the longitudinal direction of the hollow parts 15 to 18 will be described in detail with reference to FIGS. 3 and 4.

Figure 4:
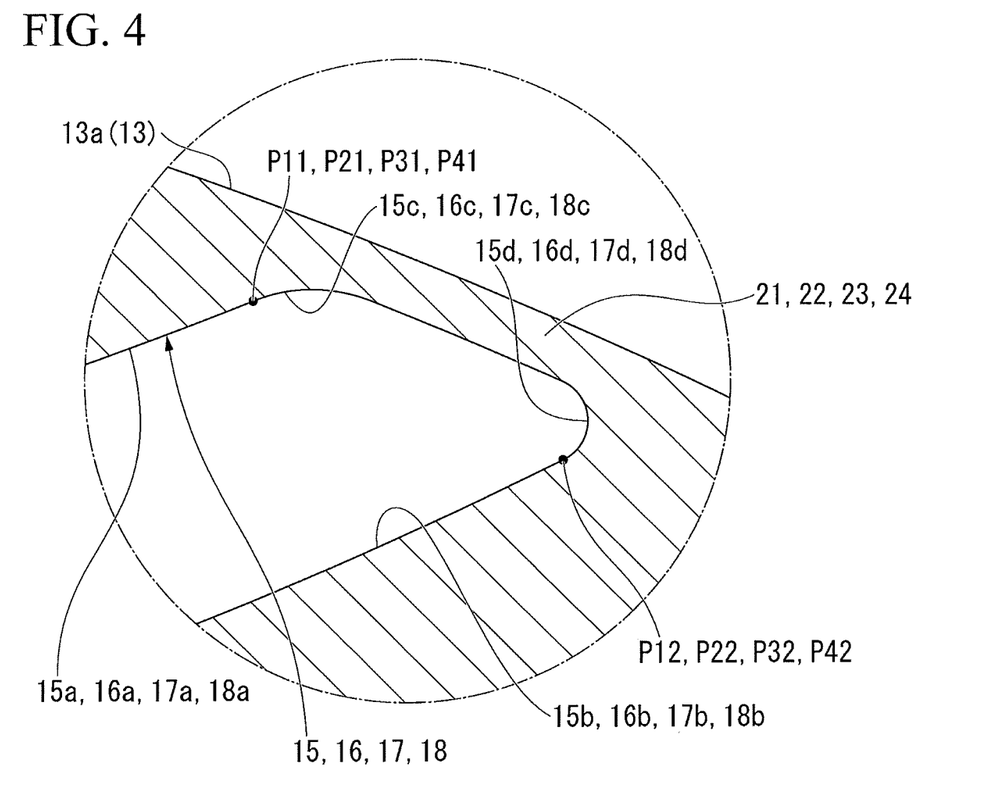
FIG. 4 is an explanatory view showing shapes of both of end portions in a longitudinal direction of each hollow part of the embodiment.

FIG. 4 is an explanatory view for explaining shapes of both of end portions in the longitudinal direction of the hollow parts 15 to 18.

Since basic configurations of the shapes of both of the end portions in the longitudinal direction of the respective hollow parts 15 to 18 are the same, one of the hollow parts will be described with the reference signs 15 to 18 denoted in FIG. 4.

As shown in FIGS. 3 and 4, each of the hollow parts 15 to 18 is formed to follow a flow of magnetic flux formed when the armature windings 11 are energized. Therefore, two inner surfaces 15a, 15b, 16a, 16b, 17a, 17b, 18a, and 18b facing each other in a short-side direction of the hollow parts 15 to 18 are not formed by one radius of curvature but are a collection of curves having a plurality of radii of curvature.

Here, although the inner surfaces 15a to 18b of the hollow parts 15 to 18 are formed to be curved so that most of central portions thereof have convex shapes toward a radially inner side, outwardly curved surfaces 15c, 16c, 17c and 18c formed to be curved in a convex shape toward a radially outer side are formed at both ends in the longitudinal direction of the inner surfaces 15a, 16a, 17a, and 18a on a side opposite to the rotating shaft 12 among the inner surfaces 15a to 18b of the hollow parts 15 to 18. That is, the hollow parts 15 to 18 respectively have inflection points P11, P21, P31, and P41 at connection portions between the inner surfaces 15a, 16a, 17a, and 18a and the outwardly curved surfaces 15c, 16c, 17c, and 18c.

On the other hand, small arc-shaped surfaces 15d, 16d, 17d, and 18d at which a radius of curvature thereof rapidly decreases are formed at both ends in the longitudinal direction of the inner surfaces 15b, 16b, 17b, and 18b on the rotating shaft 12 side among the inner surfaces 15a to 18b of the hollow parts 15 to 18. That is, the hollow parts 15 to 18 respectively have curvature change points P12, P22, P32, and P42 at connection portions between the inner surfaces 15b, 16b, 17b, and 18b and the small arc-shaped surfaces 15d, 16d, 17d, and 18d.

Then, the bridges 21 to 24 are respective thick portions on a side of the outer circumferential portion of the rotor core 13 at each of the hollow parts 15 to 18 between the inflection points P11, P21, P31, and P41 and the curvature change points P12, P22, P32, and P42.

Here, (1) A circumferential width (circumferential length) W2 between the second bridge 22 and the third bridge 23 is set to be greater than a circumferential width (circumferential length) W1 between the first bridge 21 and the second bridge 22 and a circumferential width (circumferential length) W3 between the third bridge 23 and the fourth bridge 24 (hereinafter referred to as condition 1).

Also, since all of the hollow parts 15 to 18 are formed to be curved in a convex shape toward the radially inner side, when the circumferential widths W1 to W3 between the hollow parts 21 to 24 are set as in the condition (1) described above, they are set as follows.

(2) That is, a width W5 between the second hollow part 16 and the third hollow part 17 is set to be greater than a width W4 between the first hollow part 15 and the second hollow part 16 and a width W6 between the third hollow part 17 and the fourth hollow part 18 (hereinafter referred to as condition 2). Further, the relationship between sizes of the widths W4 to W6 between the hollow parts 15 to 18 also applies to any arbitrary portion in setting of the relationship between sizes of the widths.

Here, specific formation positions of the hollow parts 15 to 18 for setting the widths W1 to W6 as in the conditions (1) and (2) described above will be described.

That is, as shown by a two-dot dashed line in FIG. 3, when the hollow parts 15 to 18 are disposed so that the circumferential widths W1 to W3 between the bridges 21 to 24 are at regular intervals, it is assumed that positions of the bridges 21 to 24 are a first reference bridge position 21K, a second reference bridge position 22K, a third reference bridge position 23K, and a fourth reference bridge position 24K, respectively. Thus, the first bridge 21 and the fourth bridge 24 are respectively disposed at the same positions as the corresponding first reference bridge position 21K and fourth reference bridge position 24K.

In contrast, the second bridge 22 is disposed at a position displaced from the second reference bridge position 22K toward the first reference bridge position 21K (the first bridge 21) (see the arrow Y1 in FIG. 3). Also, the third bridge 23 is disposed at a position displaced from the third reference bridge position 23K toward the fourth reference bridge position 24K (the fourth bridge 24) (see the arrow Y2 in FIG. 3).

Thereby, the circumferential widths W1 to W3 between the bridges 21 to 24 can be set as in the condition (1) described above. As a result, the widths W4 to W6 between the hollow parts 15 to 18 can be set as in the condition (2) described above.

An optimum value when such a condition (1) is satisfied will be described below.

That is, when an angle between a first straight line L1 passing through the central axis O and the inflection point P11 of the first bridge 21 (first hollow part 15) and the pole end E1 is $\theta 1$, an angle between a second straight line L2 passing through the central axis O and the curvature change point P12 of the first bridge 21 (first hollow part 15) and the pole end E1 is $\theta 2$, an angle between a third straight line L3 passing through the central axis O and the inflection point P21 of the second bridge 22 (second hollow part 16) and the pole end E1 is $\theta 3$, an angle between a fourth straight line L4 passing through the central axis O and the curvature change point P22 of the second bridge 22 (second hollow part 16) and the pole end E1 is $\theta 4$, an angle between a fifth straight line L5 passing through the central axis O and the inflection point P31 of the third bridge 23 (third hollow part 17) and the pole end E1 is $\theta 5$, an angle between a sixth straight line L6 passing through the central axis O and the curvature change point P32 of the third bridge 23 (third hollow part 17) and the pole end E1 is $\theta 6$, an angle between a seventh straight line L7 passing through the central axis O and the inflection point P41 of the fourth bridge 24 (fourth hollow part 18) and the pole end E1 is $\theta 7$, and an angle between an eighth straight line L8 passing through the central axis O and the curvature change point P42 of the fourth bridge 24 (fourth hollow part 18) and the pole end E1 is $\theta 8$, the respective angles $\theta 1$ to $\theta 8$ are set to satisfy $$\theta1=36.6°, \theta2=31°, \theta3=23.3°, \theta4=20°, \theta5=12.8°,$$
$$\theta6=9.4°, \theta7=5.5°, \theta8=3.2° \quad (1)$$

Next, an interaction between the rotor core 13 having the angles θ1 to θ8 set as in Expression (1) above and the stator core 8 having the number of teeth 9 and slots 10 set to "36" will be described with reference to FIGS. 5 and 6.

Figure 5:
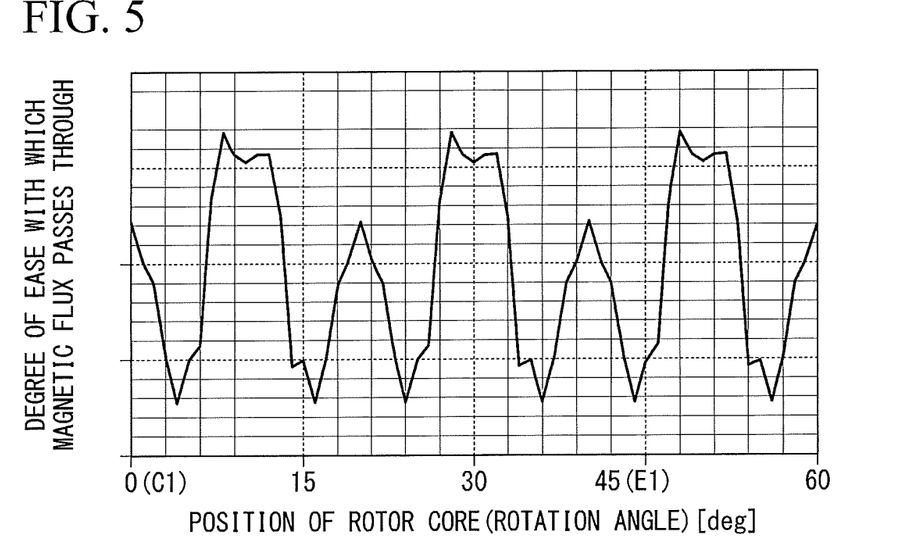
FIG. 5 is a graph showing change in a degree of ease with which magnetic flux passes through a rotor core of the embodiment.

FIG. 5 is a graph showing change in a degree of ease with which magnetic flux passes through the rotor core 13 when the vertical axis represents a degree of ease with which the magnetic flux passes through the rotor core 13 and the horizontal axis represents a position of the rotor core 13 (rotation angle [deg]).

As shown in FIG. 5, it can be confirmed that, when the hollow parts 15 to 18 are formed, a degree of ease with which magnetic flux passes through changes from the pole center C1 (position of rotation angle 0°) to the pole end E1 (position of rotation angle 45°) of the rotor core 13. Here, since the hollow parts 15 to 18 are respectively formed at positions corresponding to the bridges 21 to 24, the magnetic flux does not readily pass through the positions corresponding to the bridges 21 to 24.

Figure 6:
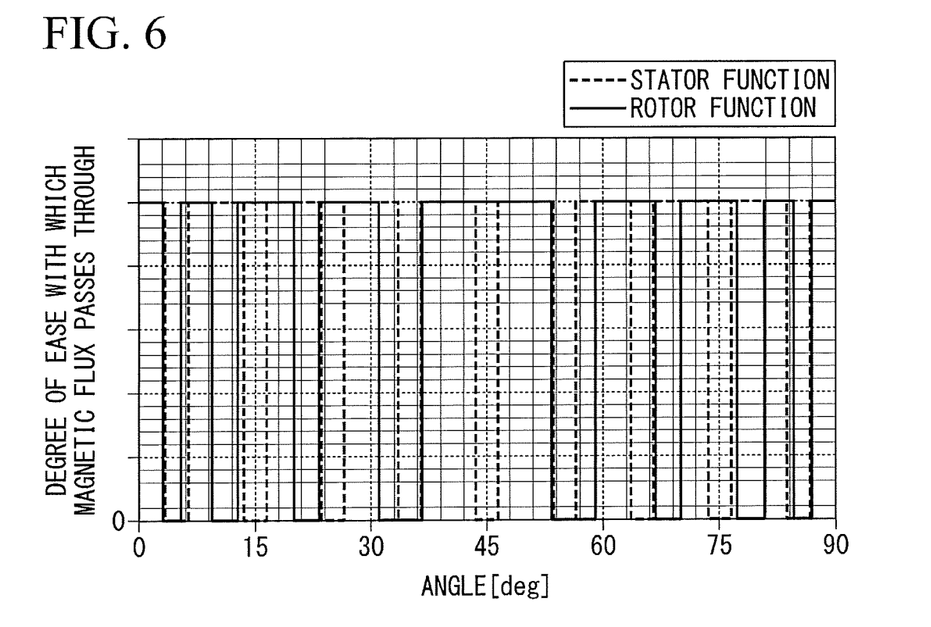
FIG. 6 is a graph in which changes in the degree of ease with which magnetic flux passes through a stator core and the rotor core of the embodiment are compared.

FIG. 6 is a graph in which changes in a degree of ease with which magnetic flux passes through the stator core 8 and the rotor core 13 arc compared when the vertical axis represents a degree of ease with which the magnetic flux passes through the stator core 8 and the rotor core 13 and the horizontal axis represents positions of the stator core 8 and the rotor core 13 (rotation angle [deg]). Further, in FIG. 6, changes in the degree of ease with which magnetic flux passes are shown in a simplified form as a rectangular wave so that the description can be more easily understood.

As shown in FIG. 6, since a portion corresponding to each of the slots 10 is a space in the stator core 8, the magnetic flux does not readily pass therethrough. When this is compared by superimposing a graph of the change in the degree of ease with which the magnetic flux passes through the stator core 8 (indicated by a broken line in FIG. 6) and a graph of the change in the degree of ease with which the magnetic flux passes through the rotor core 13 (indicated by a solid line in FIG. 6), it can be confirmed that there is almost no portion through which the magnetic flux does not readily pass, that is, almost no portion in which the degree of ease with which the magnetic flux passes therethrough is "0."

Here, as described above, torque ripple is generated by an interaction between magnetic irregularities of the stator 6 and magnetic irregularities of the rotor 7. That is, in FIG. 6, as the number of portions in which the degree of ease with which the magnetic flux passes therethrough is "0" becomes larger, the number of times in which a rapid change in magnetic flux density occurs increases, and thus the torque ripple tends to increase. Therefore, the torque ripple can be reduced in the rotor core 13 of the present embodiment in which there is almost no portion in which the degree of ease with which the magnetic flux passes therethrough is "0."

Figure 7:
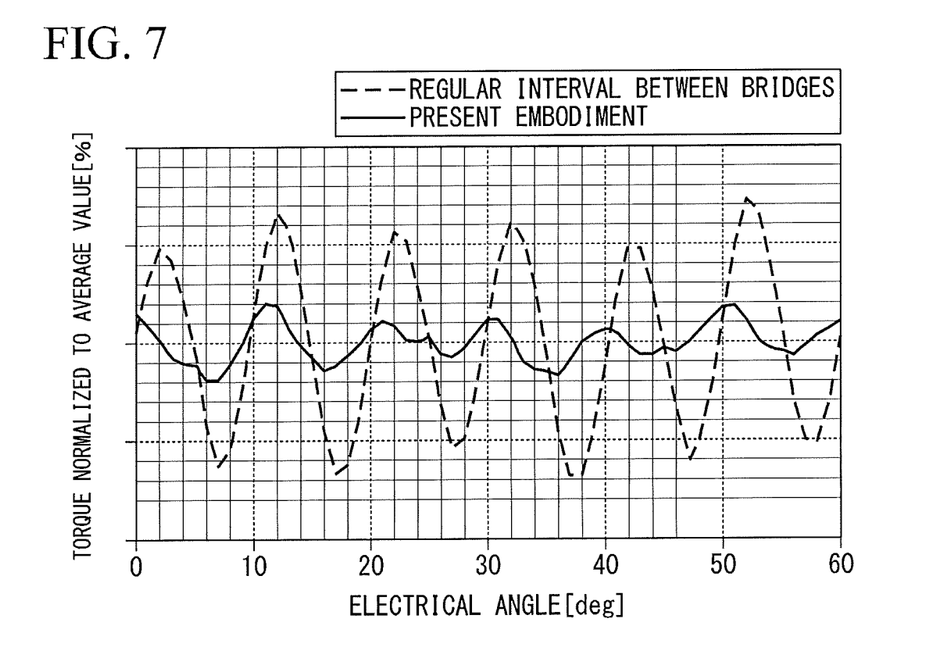
FIG. 7 is a graph in which changes in torque of the rotary electric machine of the embodiment are compared between a case in which circumferential widths between bridges are at regular intervals and a case in which circumferential widths between bridges are set to predetermined widths.

FIG. 7 shows change in torque of the rotary electric machine 1 when the vertical axis represents a torque and the horizontal axis represents an electrical angle of the rotor 7, and compares a case in which the circumferential widths W1 to W3 between the bridges 21 to 24 are at regular intervals and a case in which the circumferential widths W1 to W3 between the bridges 21 to 24 are set to satisfy Expression (1) above.

As shown in FIG. 7, when the circumferential widths W1 to W3 between the bridges 21 to 24 are set to satisfy Expression (1) above, it can be confirmed that the change in torque (torque ripple) is reduced compared to the case in which the circumferential widths W1 to W3 between the bridges 21 to 24 are at regular intervals.

In this way, in the embodiment described above, the circumferential widths W1 to W3 between the bridges 21 to 24 are set to satisfy the condition 1 described above. Also, the widths W4 to W6 between the hollow parts 15 to 18 are set to satisfy the condition 2 described above. Therefore, the torque ripple can be reduced without causing a decrease in torque performance of the rotary electric machine 1, and a performance of the rotary electric machine 1 can be improved.

Then, in order for the widths W1 to W6 to satisfy the conditions (1) and (2) described above, the first bridge 21 and the fourth bridge 24 are respectively disposed at the same positions as the corresponding first reference bridge position 21K and fourth reference bridge position 24K. On the other hand, the second bridge 22 is disposed at a position displaced from the second reference bridge position 22K toward the first reference bridge position 21 K (the first bridge 21). Further, the third bridge 23 is disposed at a position displaced from the third reference bridge position 23K toward the fourth reference bridge position 24K (the fourth bridge 24). Therefore, the torque ripple can be effectively reduced while preventing the torque of the rotary electric machine 1 from being reduced.

Also, in the rotary electric machine 1 in which the number of teeth 9 and slots 10 of the stator core 8 is set to "36," the rotor core 13 is configured to have four poles, and four layers of the hollow parts 15, 16, 17, and 18 are formed for each pole (a quarter-circumference circumferential angular region of the rotor core 13) of the rotor core 13, the torque ripple can be most effectively reduced when the circumferential widths W1 to W3 between the bridges 21 to 24 are set to satisfy the Expression (1) above.

Further, in the embodiment described above, a case in which each of the hollow parts 15 to 18 of the rotor core 13 is formed to be curved toward the radially inner side so that the pole center C1 thereon is positioned furthest inward in the radial direction has been described. However, it is not limited thereto as long as each of the hollow parts 15 to 18 extends in the q-axis direction. For example, each of the hollow parts 15 to 18 may be formed in substantially a V-shape or at least a portion thereof may be formed in a straight line when viewed from the central axis O direction.

Also, in the embodiment described above, a case in which the pump unit 2 is connected to the rotary electric machine 1 to form the hydraulic pump 100 has been described. However, it is not limited thereto, and the rotary electric machine 1 can be used for various applications.

According to at least any one of the embodiments described above, the circumferential widths W1 to W3 between the bridges 21 to 24 are set to satisfy the condition 1 described above. Further, the widths W4 to W6 between the hollow parts 15 to 18 are set to satisfy the condition 2 described above. Therefore, the torque ripple can be reduced without causing a decrease in torque performance of the rotary electric machine 1, and a performance of the rotary electric machine 1 can be improved.

Then, in order for the widths W1 to W6 to satisfy the conditions (1) and (2) described above, the first bridge 21 and the fourth bridge 24 are respectively disposed at the same positions as the corresponding first reference bridge position 21K and fourth reference bridge position 24K. In contrast, the second bridge 22 is disposed at a position displaced from the second reference bridge position 22K toward the first reference bridge position 21K (first bridge 21). Further, the third bridge 23 is disposed at a position displaced from the third reference bridge position 23K toward the fourth reference bridge position 24K (fourth bridge 24). Therefore, the torque ripple can be effectively reduced while preventing the torque of the rotary electric machine 1 from being reduced.

Also, in the rotary electric machine 1 in which the number of teeth 9 and slots 10 of the stator core 8 is set to "36," the rotor core 13 is configured to have four poles, and four layers of the hollow parts 15, 16, 17, and 18 are formed for each pole (a quarter-circumference circumferential angular region of the rotor core 13) of the rotor core 13, the torque ripple can be most effectively reduced when the circumferential widths W1 to W3 between the bridges 21 to 24 are set to satisfy the Expression (1) above.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A synchronous reluctance rotary electric machine comprising:
    a shaft rotating around a rotation axis; and
    a rotor core fixed to the shaft, including four layers of hollow parts having a convex shape toward a radially inner side formed for each pole in cross section, and including bridges between the respective hollow parts and an outer circumferential surface thereof, wherein,
    in each pole, when a center in a circumferential direction is a pole center, both ends in the circumferential direction are pole ends, and the plurality of bridges are a first layer bridge, a second layer bridge, a third layer bridge, and a fourth layer bridge in order from the pole center toward each of the pole ends, a circumferential width between the second layer bridge and the third layer bridge is set to be greater than a circumferential width between the first layer bridge and the second layer bridge and a circumferential width between the third layer bridge and the fourth layer bridge.

2. The synchronous reluctance rotary electric machine according to claim 1, wherein, when the four layers of the hollow parts are a first layer hollow part, a second layer hollow part, a third layer hollow part, and a fourth layer hollow part in order from a hollow part farthest from the shaft toward the shaft, a width between the second layer hollow part and the third layer hollow part is set to be greater than a width between the first layer hollow part and the second layer hollow part and a width between the third layer hollow part and the fourth layer hollow part.

3. The synchronous reluctance rotary electric machine according to claim 1, wherein,
    when the circumferential width between the first layer bridge and the second layer bridge, the circumferential width between the second layer bridge and the third layer bridge, and the circumferential width between the third layer bridge and the fourth layer bridge are at regular intervals, and
    when positions of the first layer bridge, the second layer bridge, the third layer bridge, and the fourth layer bridge are a first reference bridge position, a second reference bridge position, a third reference bridge position, and a fourth reference bridge position, respectively,
    the first layer bridge is formed at the first reference bridge position,
    the fourth layer bridge is formed at the fourth reference bridge position,
    the second layer bridge is formed at a position displaced from the second reference bridge position toward the first reference bridge position, and
    the third layer bridge is formed at a position displaced from the third reference bridge position toward the fourth reference bridge position.

4. The synchronous reluctance rotary electric machine according to claim 1, further comprising a stator core formed in a cylindrical shape to surround the rotor core and including 36 slots through which windings are inserted, wherein
    an edge portion on the bridge side of each of the hollow parts includes:
    an inflection point that changes from a curve protruding radially inward to a curve protruding radially outward toward the outer circumferential surface; and
    a curvature change point at which a magnitude of a radius of curvature changes rapidly, and
    when an angle between a first straight line passing through the rotation axis and the inflection point of the first layer bridge and the pole end is $\theta 1$,
    an angle between a second straight line passing through the rotation axis and the curvature change point of the first layer bridge and the pole end is $\theta 2$,
    an angle between a third straight line passing through the rotation axis and the inflection point of the second layer bridge and the pole end is $\theta 3$,
    an angle between a fourth straight line passing through the rotation axis and the curvature change point of the second layer bridge and the pole end is $\theta 4$,
    an angle between a fifth straight line passing through the rotation axis and the inflection point of the third layer bridge and the pole end is $\theta 5$,
    an angle between a sixth straight line passing through the rotation axis and the curvature change point of the third layer bridge and the pole end is $\theta 6$,
    an angle between a seventh straight line passing through the rotation axis and the inflection point of the fourth layer bridge and the pole end is $\theta 7$, and
    an angle between an eighth straight line passing through the rotation axis and the curvature change point of the fourth layer bridge and the pole end is $\theta 8$,
    each of the angles is set to satisfy
    $\theta 1 = 36.6°$,
    $\theta 2 = 31°$,
    $\theta 3 = 23.3°$,
    $\theta 4 = 20°$,
    $\theta 5 = 12.8°$,
    $\theta 6 = 9.4°$,
    $\theta 7 = 5.5°$, and
    $\theta 8 = 3.2°$.

* * * * *